Patented Dec. 20, 1932

1,891,294

UNITED STATES PATENT OFFICE

CONWAY, BARON von GIRSEWALD AND WOLFHART SIECKE, OF FRANKFORT-ON-THE-MAIN, AND ERICH THIELER, OF BAD HOMBURG VOR DER HOHE, GERMANY, ASSIGNORS TO AMERICAN LURGI CORPORATION, OF NEW YORK, N. Y., A CORPORATION OF NEW YORK

PROCESS FOR FACILITATING THE SEPARATION OF THE PRECIPITATE OF ARSENIC SULPHIDE

No Drawing. Application filed April 7, 1931, Serial No. 528,450, and in Great Britain and Sweden April 10, 1930.

The present invention relates to a process for facilitating the separation of the precipitate of arsenic sulphide obtained when precipitating the arsenic, for example with sulphuretted hydrogen, from acid liquids or from acids of any concentration, and particularly concentrated sulphuric acid, which are contaminated with arsenic. As is well known, the separation of such precipitates from the liquids is rendered extremely difficult due to the fact that especially when dealing with concentrated acids, the said precipitates come down in a form in which they will only settle with extreme slowness and then can only be filtered with very great difficulty.

It has now been found in accordance with the present invention, that such precipitates can be separated with great rapidity and completeness even from acids of maximum concentration, for example from sulphuric acid with a concentration up to 66° Bé. and more, by admixing liquids and especially organic liquids with the acid in a finely divided form, before, during or after the precipitation, the said added liquids being of lower specific gravity than the acid, and being practically insoluble therein and also being sufficiently stable in the presence of the acid at the working temperature. At the same time, measures must be taken to ensure the presence in the reaction liquid of substances known in the technology of flotation as frothing agents.

Among the liquid auxiliary substances to be used there may be mentioned for example, cyclic or acyclic hydrocarbons and particularly products of the most diverse kinds obtained by the distillation of tar, such as benzene, toluene and the like, hydrocarbons of the paraffin series and derivatives, particularly inorganic derivatives of the above named substances, such as for example halogen substitution products and the like and also two or more different substances or mixtures of substances of the said kind.

Examples of suitable frothing agents which in general are to be employed in very small amounts, are substances such as oil of turpentine, pine oil and the like. Moreover, two or more such frothing agents may be employed simultaneously or in admixtures with one or more of the liquid auxiliary substances hereinbefore mentioned.

The said auxiliary substances are introduced into the liquid under treatment prior to, or simultaneously with or after the precipitation of the arsenic sulphide, in as fine a state of subdivision as possible, and preferably by simultaneously vigorously stirring said liquid by mechanical means, or in any other manner, for example also by passing in finely divided gases such as for example, air, whereupon after the mixture has been allowed to stand the precipitate of arsenic sulphide separates out rapidly and completely on the surface of the acid together with the auxiliary substances introduced and the acid becomes clear. The slimy or pasty mass thus obtained can thereupon be readily separated from the liquid in any desired manner, for example by decantation, filtering, centrifuging or the like.

Example

The arsenic is precipitated in known manner as sulphide from an arseniferous sulphuric acid of 60° Bé. 1 to 5% of benzene is then added to the yellow turbid liquid whilst stirring, 10 to 20 ccs. of pine oil also being added per litre of benzol. The stirring is stopped after 20 to 30 minutes. Even on standing for only a few minutes, the precipitate of sulphide separates out on the surface together with the benzene. On passing the liquid for example through a wire gauze sieve, the precipitate can be very readily separated from the acid. The acid run off, which is still turbid on account of the sodium bisulphate separated out, is filtered through a coarse sand filter, the size of the sand grains being for example 0.7 to 1.4 mm. The sulphide slime which contains benzene is heated to a temperature of 80 to 100° C. in an iron retort, and the benzene coming over is collected in a receiver.

We claim:—

1. A method for removal of arsenic sulphide precipitates from acid liquids which comprises adding thereto an organic liquid which is lighter than the acid liquid, is substantially insoluble therein, and is substantially resistant thereto at the temperature of treatment, and an oily frothing agent, vigorously agitating the mixture and allowing it to stand.

2. A method for removal of arsenic sulphide precipitates from concentrated sulphuric acid which comprises adding thereto an organic liquid which is lighter than the acid, is substantially insoluble therein, and is substantially resistant thereto at the temperature of treatment, and an oily frothing agent vigorously agitating the mixture and allowing it to stand.

3. A method for removal of arsenic sulphide precipitates from acid liquids which comprises adding thereto a liquid hydrocarbon which is lighter than the acid liquid, is substantially insoluble therein, and is substantially resistant thereto at the temperature of treatment, and an oily frothing agent, vigorously agitating the mixture and allowing it to stand.

4. A method for removal of arsenic sulphide precipitates from acid liquids which comprises adding thereto a liquid hydrocarbon substitution product which is lighter than the acid liquid, is substantially insoluble therein, and is substantially resistant thereto at the temperature of treatment, and an oily frothing agent, vigorously agitating the mixture and allowing it to stand.

In testimony whereof, we affix our signatures.

CONWAY, BARON von GIRSEWALD.
WOLFHART SIECKE.
ERICH THIELER.